(12) United States Patent
Gordon

(10) Patent No.: US 6,318,198 B1
(45) Date of Patent: Nov. 20, 2001

(54) BICYCLE TRANSMISSION

(76) Inventor: Lester L. Gordon, 409 6th St., Natchitoches, LA (US) 71457

( * ) Notice: Subject to any disclaimer, the term of this patent is extended or adjusted under 35 U.S.C. 154(b) by 0 days.

(21) Appl. No.: 09/573,411

(22) Filed: May 18, 2000

(51) Int. Cl.[7] .................................................. F16H 3/22
(52) U.S. Cl. .......................................... 74/341; 74/665 GA
(58) Field of Search ..................... 74/341, 335, 665 GA, 74/594.2, 594.4

(56) References Cited

U.S. PATENT DOCUMENTS

| | | |
|---|---|---|
| 1,322,388 | 11/1919 | Wood . |
| 2,538,625 * | 1/1951 | Moore .................................... 74/354 |
| 3,209,609 * | 10/1965 | Kirschmann ........................... 74/349 |
| 4,666,172 | 5/1987 | Hartmann .............................. 280/238 |
| 4,721,015 | 1/1988 | Hartmann ............................. 74/750 B |
| 4,823,641 | 4/1989 | Kuhn et al. ............................ 74/760 |
| 4,955,247 | 9/1990 | Marshall ................................. 74/347 |
| 5,516,132 * | 5/1996 | Simkins ............................... 280/236 |
| 5,517,873 | 5/1996 | Gordon .................................. 74/325 |
| 5,611,556 | 3/1997 | Davidow .............................. 280/236 |
| 5,810,379 | 9/1998 | Shusterman .......................... 280/231 |
| 5,975,266 * | 11/1999 | Balhorn ................................. 192/64 |

* cited by examiner

Primary Examiner—Sherry Estremsky
Assistant Examiner—Tisha D. Lewis
(74) Attorney, Agent, or Firm—Richard L. Miller, P.C.

(57) ABSTRACT

An improved bicycle transmission of a type having a housing, a pair of walls, a primary axis, primary gears, a splined shaft, a meshing gear, a primary group, an independent gear, an intermediate axis, intermediate gears, a final axis, shifting apparatus, a gear cover, a shifting arm, a locking apparatus, and a spring. The improvement includes the locking apparatus having a plate that is vertically pivotally attached above, and selectively engages and locks, the shifting arm, and a jaw that is substantially U-shaped, depends concentrically from the plate, and terminates in a plurality of alternating flutes and bumps, with the shifting arm being maintained against unwanted movement by engaging in a respective flute of the plurality of flutes of the jaw and being selectively maintained therein by the biasing of the spring.

6 Claims, 3 Drawing Sheets

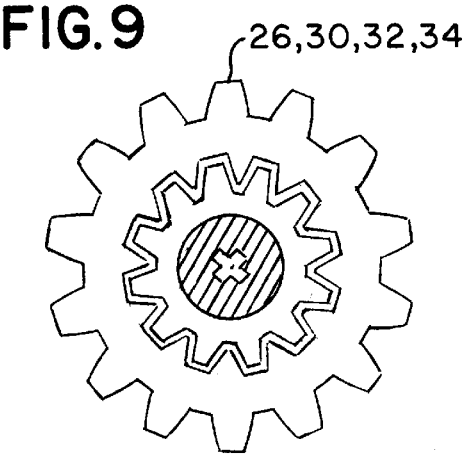
FIG. 9  26, 30, 32, 34
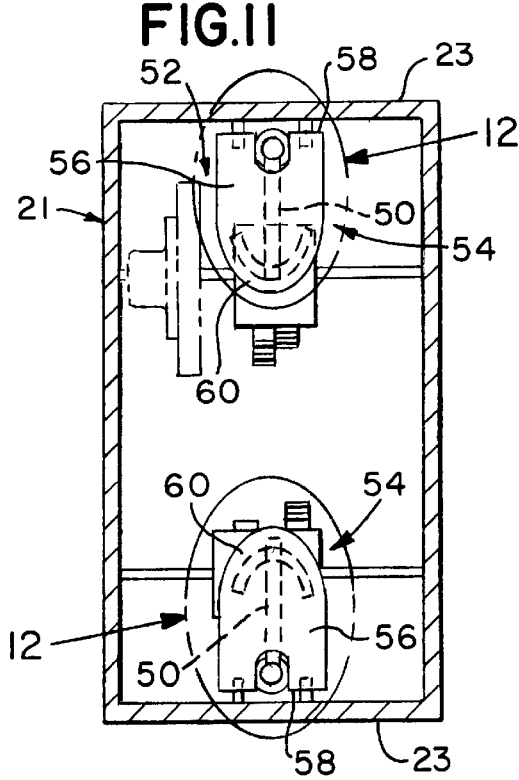
FIG. 11
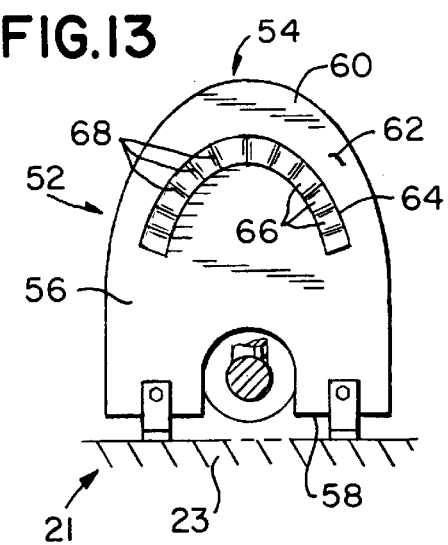
FIG. 13
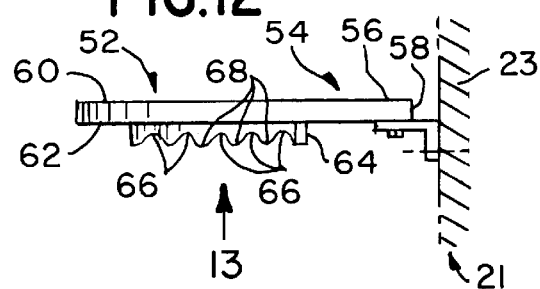
FIG. 12

BICYCLE TRANSMISSION

BACKGROUND OF THE INVENTION

1. Field of the Invention

The present invention relates to a bicycle transmission. More particularly, the present invention relates to an improved bicycle transmission.

2. Description of the Prior Art

Numerous innovations for transmissions have been provided in the prior art that will be described. Even though these innovations may be suitable for the specific individual purposes to which they address, however, they differ from the present invention.

A FIRST EXAMPLE, U.S. Pat. No. 1,322,388 to Wood teaches a variable speed gearing mechanism comprising a casing, a main shaft rotatable mounted in opposite walls of the casing, a sleeve in surrounding relation to the shaft and extending into and out of the cashing, a power transmitting element carried by the sleeve exterior to the casing, a gear carried by the sleeve interior to the casing, a sleeve member mounted on the shaft interior to the casing, the said sleeve member being longitudinally movable on the shaft but precluded from angular thereon, a pair of spaced gears carried within the casing, a plurality of gears positively interconnected and rotatable mounted on said stationary shaft, one of the said plurality of gears being in mesh with the first said gear, means for shifting the sleeve member so that one or the other of the gears carried thereby may be thrown into mesh with one or the other of the remaining of the plurality of gears, and pins inserted in one side of the first said gear on opposite sides of the center thereof, the distance between the pins being substantially equal to the pitched diameter of one of the gears of said sleeve member to permit the said pins engaging between the teeth of diametrically opposite pairs of teeth of the said gear carried by the sleeve member, whereby the power transmitting device may be positively driven by the said shaft but at various angular velocities with respect to the angular velocity of the said main shaft.

A SECOND EXAMPLE, U.S. Pat. No. 4,666,172 to Hartmann teaches a multiple speed planetary transmission which mounts inside the wheel hub of the driving wheel or wheels of a bicycle or the like, concentric with the pedal drive shaft. The transmission includes a gear case mounted on ball bearings on the pedal drive shaft, a cylindrical extension of the gear case being clamped to the bicycle frame on one side. Multiple sets of different size planet gears are rotatable mounted on a planet gear carrier fitting driven by the pedal drive shaft. A ring gear is mounted in tracks in the gear case with its axial position adjustable so that it can be positioned to mesh with any one of multiple sets of different size planet gears. A sun gear assembly has its multiple gears in constant mesh, respectively, with multiple sets of planet gears. A conventional free-wheel ratchet mechanism drives the wheel hub from the sun gear assembly, and a second conventional free-wheel ratchet mechanism drives the sun gear assembly from the drive shaft to provide a direct drive option. This compact, low maintenance transmission permits the wheelbase for a tandem bicycle using it to be the same as the wheelbase for a conventional single bicycle.

A THIRD EXAMPLE, U.S. Pat. No. 4,721,015 to Hartmann teaches a three stage, sixteen-speed, planetary driving wheel, with the pedal drive shaft on the axis of the wheel and vehicle interface fittings on both sides inboard of the pedal crank arms, for mounting in pedal powered vehicles to replace the chain and derailleur system used in conventional multiple speed bicycles. Because the planetary gear arrangement is completely enclosed inside the wheel hub where it is well protected from dirt, and because this driving wheel provided five low range speeds below direct drive, it is well suited for mountain bicycles or for transporting the payload of a bicycle camper up steep grades.

A FOURTH EXAMPLE, U.S. Pat. No. 4,823,641 to Kuhn et al. teaches a planetary gear transmission having four or five forward speeds and which comprises three planetary gear sets with clutches and brakes for speed selection. The planet carriers of the sets are connected together and positively connected to the output shaft, while the planet gearing for the first two gear sets utilizes a planet gear of the second gear set which extends axially over both the first and second gear sets and meshes with the internal and sun gears of the second gear set, and a planet gear on the common planet carrier which meshes only with the internal gear of the first gear set and with the planet gear of the second gear set.

A FIFTH EXAMPLE, U.S. Pat. No. 4,955,247 to Marshall teaches a multi-speed transmission that has particular usefulness in bicycles, completely eliminating the use of the commonly used derailleur and the exposed flexible cable and the readjustment problems inherent with that prior structure. The transmission includes separate concentric gear rings which to a certain extent operate independently of each other. A shift mechanism for shifting the transmission is such the transmission can not be shifted from one gear to a non-adjacent gear without stopping at a gear therebetween. That is, no gear can be skipped. This is accomplished by a particular relationship of a pawl, a pusher, a shift segment plate and barrels mounted on the shift segment plate, among other parts.

A SIXTH EXAMPLE, U.S. Pat. No. 5,517,873 to Gordon teaches a bicycle transmission, comprising a primary axis mechanically linked to bicycle pedals, an intermediate axis, and a final axis, mechanically attached to the bicycle drive wheel. Gears of different sizes are located on each axis. The intermediate axis contains gears mounted in fixed locations along the intermediate axis. The primary axis has a group of gears that are movable along the primary axis so as to vary which gears on the primary axis engage gears on the intermediate axis. The final axis also has a group of gears that are movable along the final axis, so as to vary which gears on the final axis engage gears on the intermediate axis. Gear covers engage gears on the primary axis and final axis to move them along the primary axis and final axis, so as to obtain various combinations of gears, to vary the overall gearing ratios between the pedals and the drive wheel.

Specifically, as shown in FIGS. 1–10, the bicycle transmission 20 comprises a housing 21 that has a pair of walls 23, a primary axis 22 that is mechanically driven by bicycle pedals 24 and contains primary gears 26, a splined shaft 28 that is parallel to the pair of walls of the housing and has at least one gear 30 and a meshing gear 32 ganged together to form a primary group 34 that is movable along the splined shaft 28, and an independent gear 36 that is normally not mechanically connected to the splined shaft 28, but is adapted to receive the meshing gear 32 and mechanically connect the independent gear 36 with the primary group 34.

The bicycle transmission 20 further comprises an intermediate axis 38 that has intermediate gears 40 that are mechanically driven by at least one primary gear 26.

The bicycle transmission 20 further comprises a final axis 42 that is driven by at least one intermediate gear 40 and is mechanically connected to a bicycle drive wheel 44, so that power from the bicycle pedals 24 is transmitted to the bicycle drive wheel 44.

The bicycle transmission 20 further comprises shifting apparatus 46 that moves the gears along at least one of the primary axis 22 and the final axis 42 to vary which gear on that axis meshes with which gear on the intermediate axis 38, so that different gearing ratios can be achieved.

The shifting apparatus 46 comprises a shifting shaft 47 that is vertically-oriented, a gear cover 48 that engages the sides of the gears, so that the gears can be moved along their axis, a shifting arm 50 that extends horizontally-outwardly from the shifting shaft 47 and moves the gear cover 48 along the axis with a range of motion, and a locking apparatus 52 that maintains the shifting arm 50 in its position after it has been moved into a suitable position and which comprises a spring 49 that extends therefrom to the housing 21 and biases the locking apparatus 52 against the shifting arm 50.

A SEVENTH EXAMPLE, U.S. Pat. No. 5,611,556 to Davidow teaches a speed change mechanism, principally for use on a bicycle, in which a plurality of driving gears and an associated plurality of driven gears are coupled by a plurality of drive chains, such that each driving gear and its associated driven gear form a gear pair, with each gear pair providing a different input-to-output drive ratio. The driving gears are fixedly mounted to a driving shaft that is operatively coupled to a power input, such as a pedal and crank assembly of a bicycle, and the driven gears are rotatable disposed around a driven hub, with means provided for shifting between and engaging one of the driven gears to the driven shaft, with the driven shaft further operatively coupled to an output gear that will transmit power to a rear wheel of a bicycle, for example.

A EIGHTH EXAMPLE, U.S. Pat. No. 5,810,379 to Shusterman teaches a drive train for a tandem bicycle, in which the riders are positioned one behind the other, comprising a transverse intermediate shaft mounted on the bottom tube of a tandem bicycle between the two standard bottom brackets for the respective riders. Chains driven by the respective riders drive separate sprockets, each having an independent free-wheel driving connections to the intermediate shaft and being smaller than the respective chain ring which drives it. The intermediate shaft has one or more relatively small chain rings to drive the rear sprockets of the bicycle. The driven rings of the intermediate shaft are smaller than the respective crossover chain rings so that the intermediate shaft is driven at a higher speed than the respective pedal cadences. So that a given gear ratio variation between largest and smallest drive rings may be achieved with a smaller arithmetic gap between the number of teeth on the drive rings. Ground clearance may be greater that of a conventional tandem bicycle due to use of smaller driven and driving chain rings and elevated positioning of the intermediate shaft. The independent freewheeling of the crank sets allow each rider to independently control the rotational position of his or her crank arms for purposes such as clearing obstacles. The present invention also allows the riders to selectively change the relative rotational orientations of the crank sets to allow, for example, pedalling in full synchronization or 90 degrees out of phase to achieve a smoother application of pedalling force.

It is apparent that numerous innovations for transmissions have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an improved bicycle transmission that avoids the disadvantages of the prior art.

ANOTHER OBJECT of the present invention is to provide an improved bicycle transmission that is simple and inexpensive to manufacture.

STILL ANOTHER OBJECT of the present invention is to provide an improved bicycle transmission that is simple to use.

BRIEFLY STATED, YET ANOTHER OBJECT of the present invention is to provide an improved bicycle transmission of a type having a housing, a pair of walls, a primary axis, primary gears, a splined shaft, a meshing gear, a primary group, an independent gear, an intermediate axis, intermediate gears, a final axis, shifting apparatus, a gear cover, a shifting arm, a locking apparatus, and a spring. The improvement includes the locking apparatus having a plate that is vertically pivotally attached above, and selectively engages and locks, the shifting arm, and a jaw that is substantially U-shaped, depends concentrically from the plate, and terminates in a plurality of alternating flutes and bumps, with the shifting arm being maintained against unwanted movement by engaging in a respective flute of the plurality of flutes of the jaw and being selectively maintained therein by the biasing of the spring.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 9 is an enlarged diagrammatic cross sectional view taken on line 9—9 in FIG. 8;

FIG. 11 is an enlarged diagrammatic cross sectional view taken on line 11—11 in FIG. 4;

FIG. 12 is an enlarged diagrammatic side elevational view of the area generally enclosed by the dotted curves identified by arrows 12 in FIG. 11 of the locking apparatus of the shifting apparatus of the present invention of the present invention; and FIG. 13 is an enlarged diagrammatic bottom plan view taken generally in the direction of arrow 13 in FIG. 12.

LIST OF REFERENCE NUMERALS UTILIZED IN THE DRAWING

Figure 1:
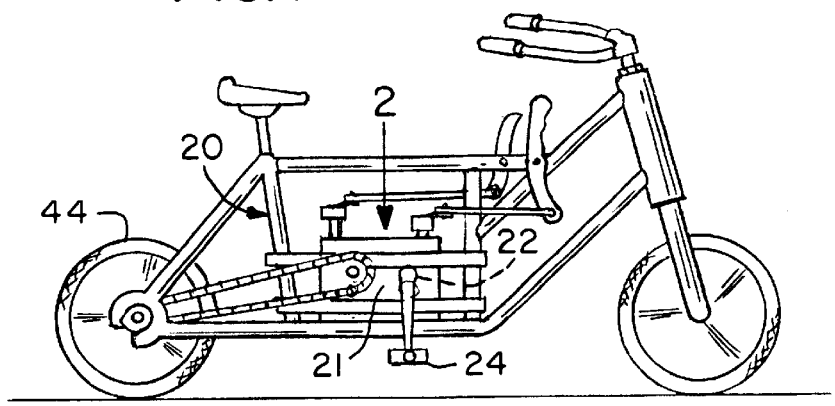
FIG. 1 is a diagrammatic side elevational view of the present invention in use.
Figure 2:
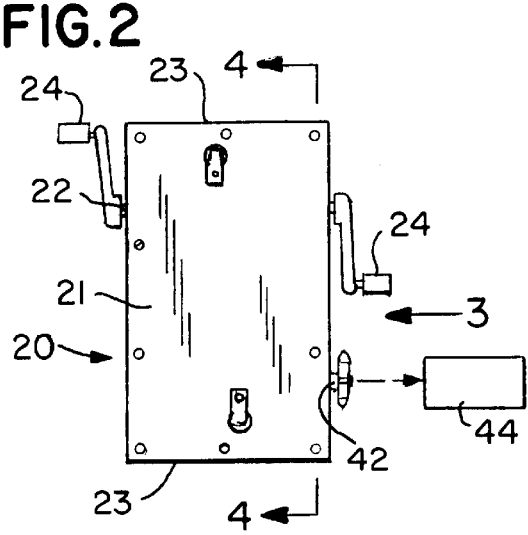
FIG. 2 is an enlarged diagrammatic top plan view taken generally in the direction of arrow 2 in FIG. 1 of present invention.
Figure 3:
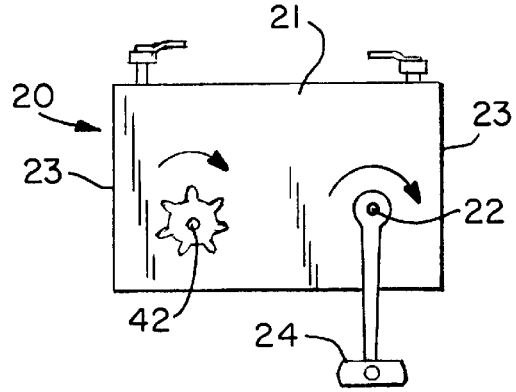
FIG. 3 is a diagrammatic side elevational view taken generally in the direction of arrow 3 in FIG. 2.
Figure 4:
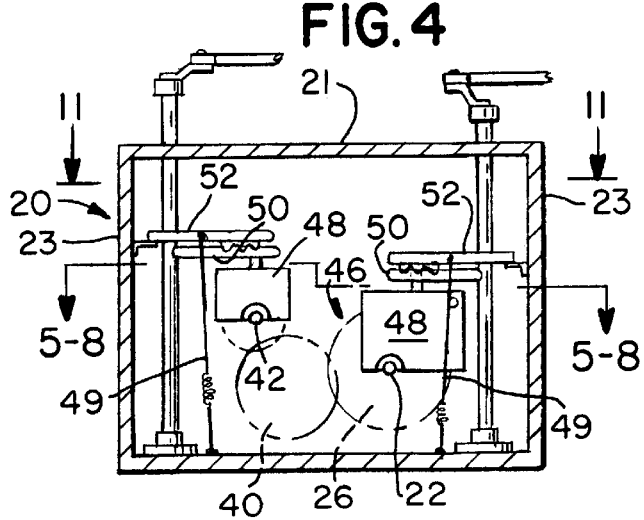
FIG. 4 is an enlarged diagrammatic cross sectional view taken on line 4—4 in FIG. 2.
Figure 10:
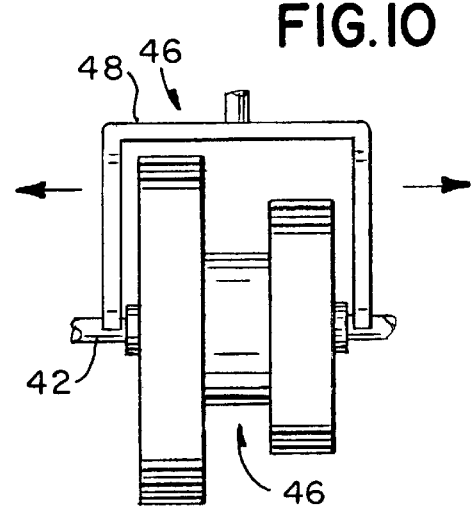
FIG. 10 is an enlarged diagrammatic front elevational view of the area generally enclosed by the dotted curves identified by arrows 10 in FIGS. 5–8 of the shifting apparatus of the present invention.
Figure 5:
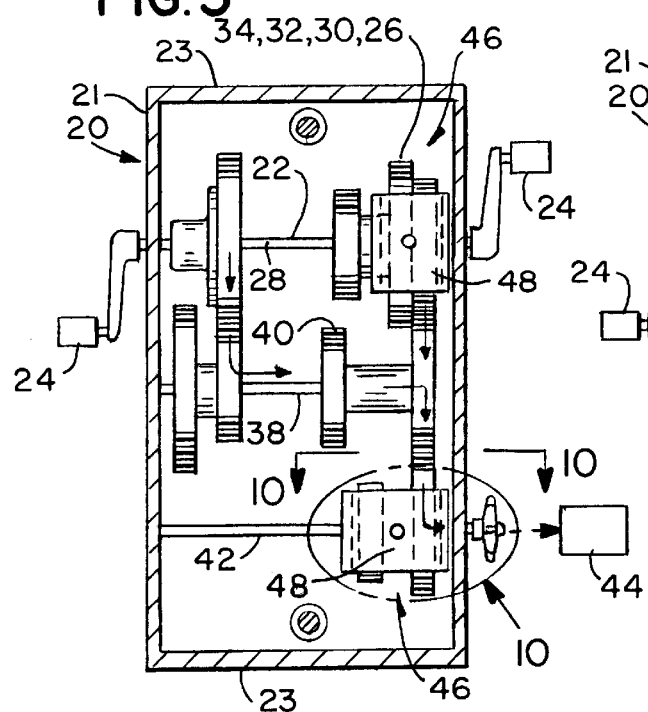
FIG. 5 is an enlarged diagrammatic cross sectional view taken on line 5—5 in FIG. 4.
Figure 6:
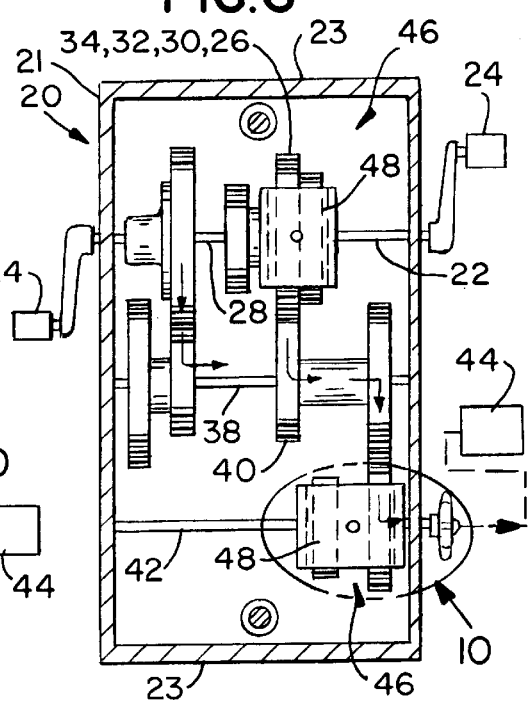
FIG. 6 is an enlarged diagrammatic cross sectional view taken on line 6—6 in FIG. 4.
Figure 7:
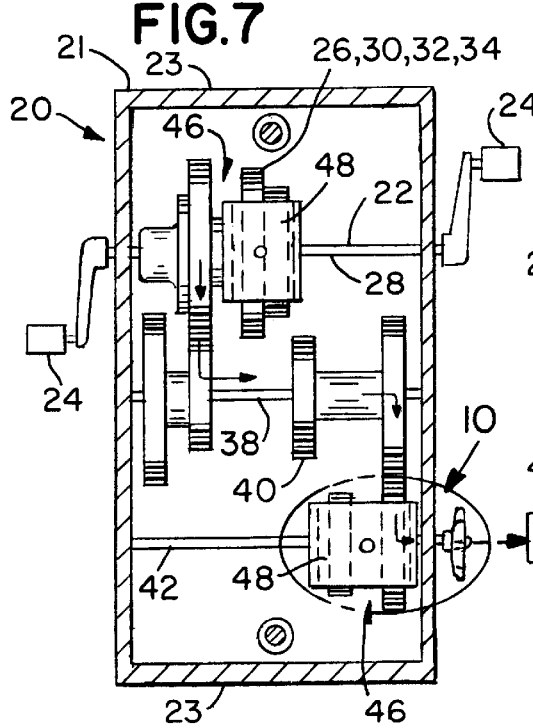
FIG. 7 is an enlarged diagrammatic cross sectional view taken on line 7—7 in FIG. 4.
Figure 8:
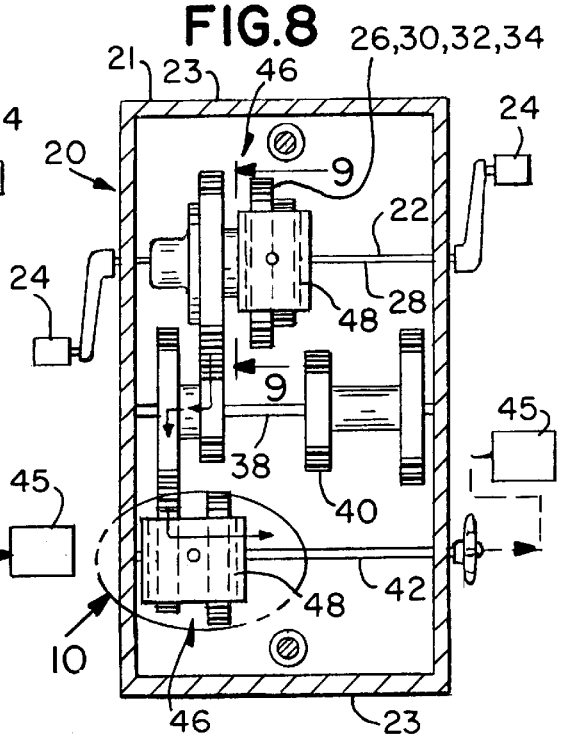
FIG. 8 is an enlarged diagrammatic cross sectional view taken on line 8—8 in FIG. 4.

Prior Art 20 bicycle transmission
21 housing
22 primary axis
23 pair of walls of housing 21
24 bicycle pedals
26 primary gears of primary axis 22
28 splined shaft of primary axis 22
30 at least one gear of primary axis 22 ganged with meshing gear 32 on splined shaft 28 of primary axis 22 to form primary group 34
32 meshing gear of primary axis 22
34 primary group of primary axis 22
36 independent gear of primary axis 22
38 intermediate axis
40 intermediate gears of intermediate axis 38
42 final axis
44 bicycle drive wheel
46 shifting apparatus
47 shifting shaft of shifting apparatus 46
48 gear cover of shifting apparatus 46
49 spring of locking apparatus 52 of shifting apparatus 46
50 shifting arm of shifting apparatus 46
52 locking apparatus of shifting apparatus 46

Present Invention 54 plate of locking apparatus 52 of shifting apparatus 46
56 substantially square-shaped rear portion of plate 54 of locking apparatus 52 of shifting apparatus 46
58 rearwardmost edge of substantially square-shaped rear portion 56 of plate 54
60 substantially semi-elliptically-shaped front portion of plate 54 of locking apparatus 52 of shifting apparatus 46
62 lowermost surface of substantially semi-elliptically-shaped front portion 60 of plate 54 of locking apparatus 52 of shifting apparatus 46
64 jaw of locking apparatus 52 of shifting apparatus 46
66 flutes of jaw 64 of locking apparatus 52 of shifting apparatus 46
68 bumps of jaw 64 of locking apparatus 52 of shifting apparatus 46

DETAILED DESCRIPTION OF THE PREFERRED EMBODIMENT

Referring now to the figures, in which like numerals indicate like parts, and particularly to FIGS. 11–13, the improvement comprises the locking apparatus 52 comprising a plate 54 that is vertically pivotally attached above, and selectively engages and locks, the shifting arm 50.

The improvement further comprises the plate 54 extending horizontally along, and completely covering the range of motion of, the shifting arm 50.

The improvement further comprises the plate 54 having a substantially square-shaped rear portion 56 with a rearwardmost edge 58, and a substantially semi-elliptically-shaped or semi-circular-shaped front portion 60 that extends coplanarly and integrally from the substantially square-shaped rear portion 56 of the plate 54 and which has a lowermost surface 62.

The improvement further comprises the rearwardmost edge 58 of the substantially square-shaped rear portion 56 of the plate 54 being vertically pivotally attached to an associated wall of the pair of walls 23 of the housing 21 and extending therefrom in the same direction as the shifting arm 50.

The improvement further comprises the rearwardmost edge 58 of the substantially square-shaped rear portion 56 of the plate 54 straddling an associated shifting arm 47.

The improvement further comprises a jaw 64 that is substantially U-shaped, depends concentrically from the lowermost surface 62 of the substantially semi-elliptically-shaped front portion 60 of the plate 54, and terminates in a plurality of alternating flutes 66 and bumps 68 that are disposed radially therealong, with the shifting arm 50 being maintained against unwanted movement by engaging in a respective flute of the plurality of flutes 66 of the jaw 64 and being selectively maintained therein by the biasing of the spring 49.

It will be understood that each of the elements described above, or two or more together, may also find a useful application in other types of constructions differing from the types described above.

While the invention has been illustrated and described as embodied in an improved bicycle transmission, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved bicycle transmission of a type having a housing with a pair of walls, a primary axis mechanically driven by bicycle pedals and containing primary gears, a splined shaft being parallel to the pair of walls of the housing and having at least one gear and a meshing gear ganged together forming a primary group being movable along the splined shaft, and an independent gear being normally not mechanically connected to the splined shaft but receiving the meshing gear and mechanically connecting the independent gear with the primary group, an intermediate axis having intermediate gears mechanically driven by at least one primary gear, a final axis driven by at least one intermediate gear and being mechanically connected to a bicycle drive wheel, and shifting apparatus moving the gears along at least one of the primary axis and the final axis to vary which gear on that axis meshes with which gear on the intermediate axis and having a shifting shaft being vertically-oriented, a gear cover engaging the sides of the gears, a shifting arm extending horizontally-outwardly from the shifting shaft and moving the gear cover along the axis with a range of motion, and a locking apparatus maintaining the shifting arm in its position after it has been moved into a suitable position and having a spring extending therefrom to the housing and biasing the locking apparatus against the shifting arm, said improvement comprising the locking apparatus comprising a plate being vertically pivotally attached above, and selectively engaging and locking, the shifting arm.

2. The improvement as defined in claim 1, wherein the improvement further comprises said plate extending horizontally along, and completely covering the range of motion of, the shifting arm.

3. The improvement as defined in claim 1, wherein the improvement further comprises said plate having:
   a) a substantially square-shaped rear portion with a rearwardmost edge; and
   b) a substantially semi-elliptically-shaped front portion extending coplanarly and integrally from said substantially square-shaped rear portion of said plate and which has a lowermost surface.

4. The improvement as defined in claim 3, wherein the improvement further comprises said rearwardmost edge of said substantially square-shaped rear portion of said plate being vertically pivotally attached to an associated wall of the pair of walls of the housing and extending therefrom in the same direction as the shifting arm.

5. The improvement as defined in claim 3, wherein the improvement further comprises said rearwardmost edge of said substantially square-shaped rear portion of said plate straddling an associated shifting arm.

6. The improvement as defined in claim 3, wherein the improvement further comprises the locking apparatus further comprising a jaw being substantially U-shaped, depending concentrically from said lowermost surface of said substantially semi-elliptically-shaped front portion of said plate, and terminating in a plurality of alternating flutes and bumps being disposed radially therealong, with the shifting arm being maintained against unwanted movement by engaging in a respective flute of said plurality of flutes of said jaw and being selectively maintained therein by the biasing of the spring.

* * * * *